J. M. PARKER.
Lamp.
No. 123,415.    Fig. 1.    Patented Feb. 6, 1872.
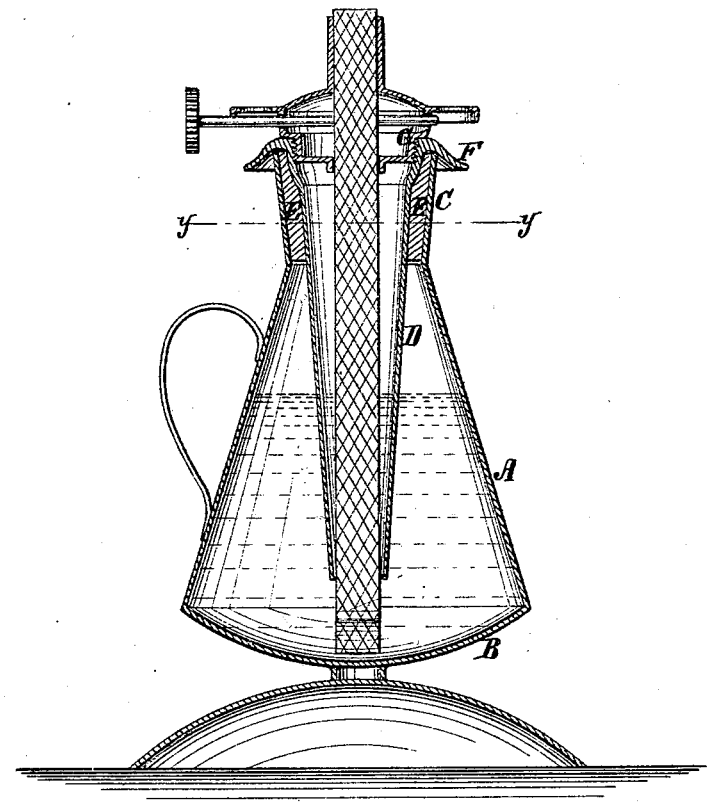
Fig. 2.
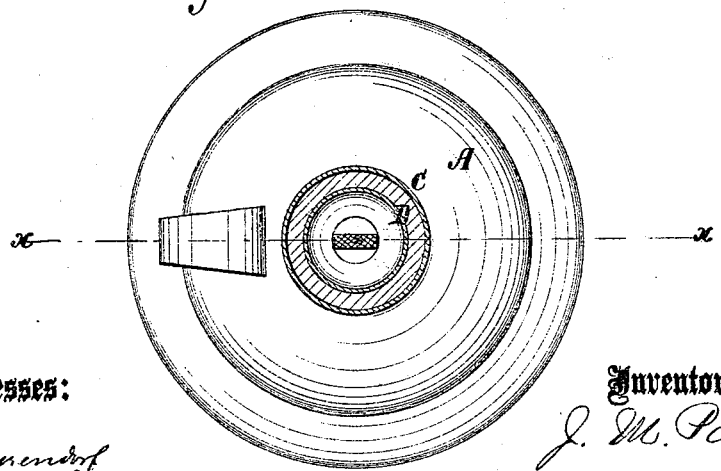
Witnesses:
A. Bennemendorf
Geo. H. Mabee
Inventor:
J. M. Parker
per
Mmm & Co
Attorneys.

123,415

UNITED STATES PATENT OFFICE.

JOSEPH M. PARKER, OF LA GRANGE, MISSOURI.

IMPROVEMENT IN LAMPS.

Specification forming part of Letters Patent No. 123,415, dated February 6, 1872.

Specification describing a certain Improvement in Lamps, invented by Dr. JOSEPH M. PARKER, of La Grange, in the county of Lewis and State of Missouri.

My invention consists of a lamp, the body of which is in the form of a frustum of a cone, with an inverted frustum of a cone at the top, and the opening at the top being very large for allowing a free escape in case of an explosion, it being intended that the burner and wick-tube, which are held in said opening by a hollow plug of elastic substance, shall be forced out vertically and relieve the lamp so that it will not be broken. The conical-shaped body is used because of being more favorable for the expansion and contraction without fracturing than other form; and the concave bottom is used because water, which I propose to use as a safeguard against explosion, freezing in such a formed bottom, will not burst it, as the said form allows the expansion without straining the walls.

Figure 1 is a sectional elevation of my improved lamp taken on the line $x\,x$ of Fig. 2, and Fig. 2 is a horizontal section of Fig. 1 taken on the line $y\,y$.

A is the conical body; B, the concave bottom; C, the inverted conical top; D, the conical tube, extending down into the body A; E, the hollow plug of elastic substance, holding the tube in the lamp; F, the annular flange on the top of the tube, resting on the top of the lamp; and G, the burner, screwing into the top of tube D. Air to fill the vacuum caused by the consumption of oil will be admitted through tube D, and will rise up to the surface of the oil. The elastic plug holds the tube in place, and keeps the top of the lamp air-tight, whether expanded by heat or contracted by cold, and offers no obstruction to such action, and it will be forced out in case explosion ever occurs, for it offers less resistance than the other parts of the lamp.

It is obvious that a lamp constructed on this plan will, in the first place, be scarcely liable to explode at all; and, in the second place, if an explosion does take place, the burner and flame will be forced away from the lamp in the most harmless direction, and the lamp will not be broken.

I propose to use water in the lamp nearly up to the lower end of the tube, on account of the fact that any burning fluid, however volatile it may be under other circumstances, gives off but a very meager portion of carburet of hydrogen, even at a high degree of heat, when resting on a column of water, whereby the danger of explosion is very much lessened.

Having thus described my invention, I claim as new and desire to secure by Letters Patent—

1. The combination of the burner and wick-supporting tube D and the hollow elastic plug E with the body of the lamp, having a large hole in the top to facilitate the escape of exploding gases, all substantially as specified.

2. The lamp-body, having the conical sides A and concave bottom B and the inverted conical top C, all substantially as specified.

JOSEPH MARTIN PARKER.

Witnesses:
A. M. McCOY,
W. H. SISLER.